United States Patent [19]

Freymann et al.

[11] Patent Number: 5,072,801
[45] Date of Patent: Dec. 17, 1991

[54] VIBRATION ABSORBER

[75] Inventors: Raymond Freymann, Eching; Albrecht Keck, Oberschleissheim; Anton Haas, Garmisch-Partenkirchen, all of Fed. Rep. of Germany

[73] Assignee: Bayerische Motoren Werke AG, Fed. Rep. of Germany

[21] Appl. No.: 454,929

[22] Filed: Dec. 22, 1989

[51] Int. Cl.⁵ .............................................. B60R 18/02
[52] U.S. Cl. .................................. 180/68.5; 188/379; 248/550; 248/598; 280/758
[58] Field of Search ................... 188/378, 379, 380; 280/758, 759; 180/282, 68.5; 267/136; 248/550, 596, 598

[56] References Cited

U.S. PATENT DOCUMENTS

| 989,958 | 4/1911 | Frahm | 188/380 |
|---|---|---|---|
| 3,483,951 | 12/1969 | Bonesho et al. | 188/379 |
| 3,991,959 | 11/1976 | Albus | 188/378 X |
| 4,575,203 | 3/1986 | Brandt et al. | 188/378 X |

FOREIGN PATENT DOCUMENTS

| 2056164 | 8/1973 | Fed. Rep. of Germany . | |
|---|---|---|---|
| 151450 | 9/1982 | Japan | 180/68.5 |
| 50243 | 3/1984 | Japan | 188/378 |
| 93544 | 5/1984 | Japan | 188/379 |
| 1096414 | 6/1984 | U.S.S.R. | 188/378 |
| 2112901 | 7/1983 | United Kingdom | 188/379 |

Primary Examiner—George E. A. Halvosa
Attorney, Agent, or Firm—Evenson, Wands, Edwards, Lenahan & McKeown

[57] ABSTRACT

An improved vibration absorber that overcomes deficiencies of known heavy vibration absorbers that require exact manufacturing tolerance for the rigidity of the absorber in order to generate a sufficiently large frequency range of the vibration absorber. The new vibration absorber has the purpose of covering a larger frequency range with a lower weight by having the absorber mass disposed to be pivotable around a pivot at one end and on an opposite side supports itself on the vehicle body through at least one bearing arrangement. The absorber mass and/or the bearing arrangement are slideably arranged with respect to the pivot. The vibration absorber may be used in vehicles which have a natural vibration in the low frequency range.

15 Claims, 4 Drawing Sheets

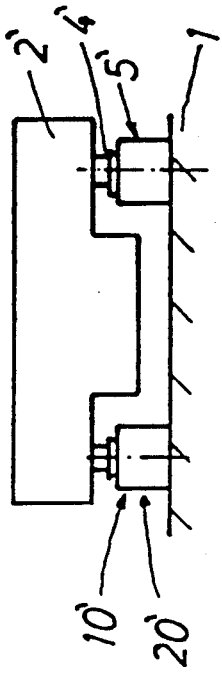
Fig.1
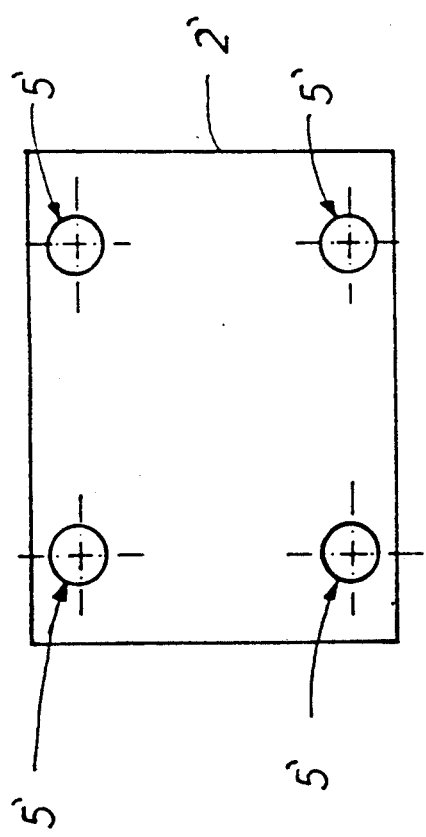
Fig.2
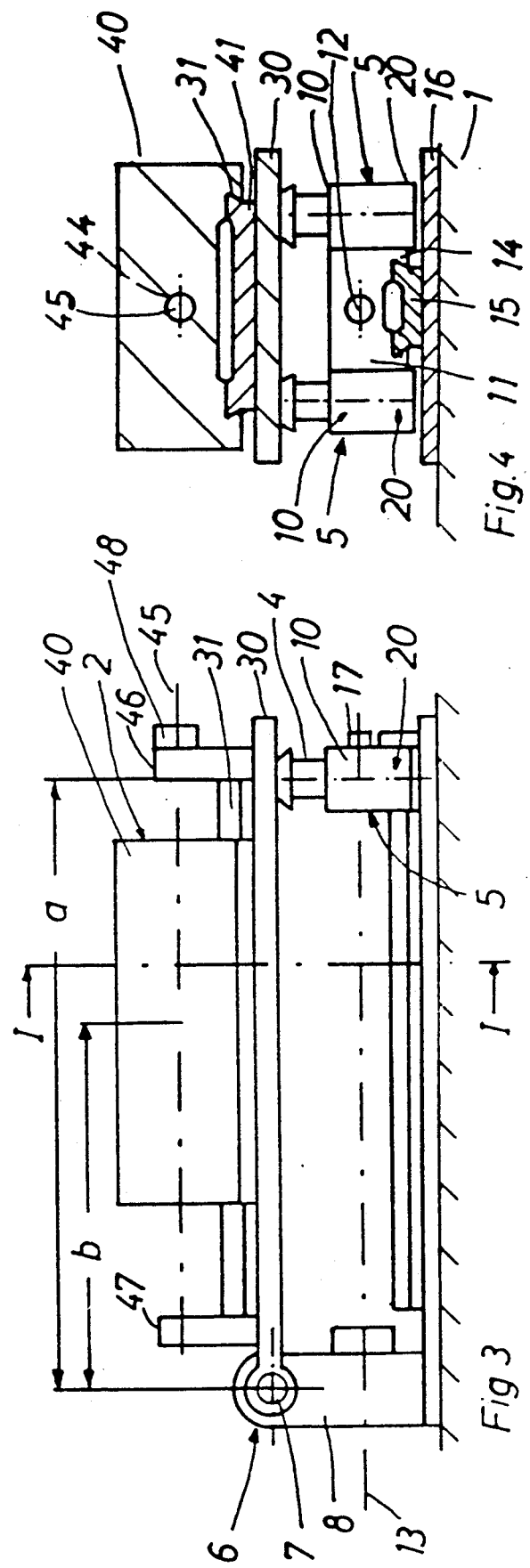
Fig.3
Fig.4

VIBRATION ABSORBER

BACKGROUND AND SUMMARY OF THE INVENTION

The invention relates to a vibration absorber comprising an absorber mass connected with a vehicle body by several arrangements that each comprise an absorber spring and an absorber damper.

In the case of vehicles without a stable roof bond (particularly convertibles and trucks) elastic torsional natural vibrations occur in the low frequency range. The reason for this is that the torsional rigidity of these vehicles is clearly reduced. The reduced torsional rigidity becomes noticeable by the occurrence of "trembling vibrations" which occur when driving over a rough road.

Vibration absorbers are known for avoiding the above-mentioned trembling vibrations in convertibles. These known vibration absorbers consist of a relatively heavy absorber mass which is connected with the vehicle body by means of four rubber bearing elements with hydraulic damping. However, this vibration absorber has the disadvantage that the natural frequency of the vibration absorber must be precisely adapted to the natural frequency of the torsional vibration of the vehicle. This adaptation requires that values for the rigidities of the absorber bearing be precisely obtained. It is also a disadvantage that a relatively heavy vibration absorber must be installed. Here, the frequency range covered by the vibration absorber is sufficiently large in order to accommodate the manufacturing tolerances of the vibration absorber as well as that of the vehicle.

It is an object of the invention to provide a vibration absorber which avoids the disadvantages occurring in this known state of the art and permits an effective damping of the torsional natural vibrations of the vehicle within a larger frequency range.

This object is achieved by having the absorber mass have one end arranged to be pivotable around a pivot with an opposite end supported on the vehicle body by way of at least one bearing arrangement and wherein either the absorber mass and/or the bearing arrangement are arranged to be adjustable with respect to the pivot.

For determining the natural frequency of the vibration absorber according to the invention, the vibration absorber is considered to be a pendulum. In the following equations, c = the spring rigidity of the bearing arrangement (N/mm)
m = the effective absorber mass (kg)
$\theta$ = the moment of inertia of the absorber mass around its center of gravity (kg$\times$mm$^2$)
a = distance between the joint and the bearing arrangement (mm)
b = distance between the joint and the center of gravity (mm)
f = natural frequency (1/s)

These quantities are related by the equation:

$$f = \frac{1}{2\pi} \sqrt{\frac{c_T}{m_T}}$$

which can be rewritten as:

$$f = \frac{1}{2\pi} \sqrt{\frac{c \times a^2}{\theta + m \times b^2}}$$

The natural frequency of the vibration absorber can therefore be adjusted by a change of the effective torsional rigidity "$c \times a^2$", when the distance "a" is changed. In addition, the natural frequency of the vibration absorber can be adjusted by a change of the effective moment of inertia "$\theta + m \times b^2$", when the distance "b" is varied.

The above-mentioned information shows that the adjustment of the natural frequency of the vibration absorber is possible at a constant torsional rigidity "c" and a constant absorber mass "m". The adjustment of the natural frequency of the vibration absorber takes place in a simple manner in that the absorber mass and/or the bearing arrangement is shifted with respect to the pivot. It is thus possible to optimally coordinate the vibration behavior of any vehicle. The frequency range which can be adjusted by the vibration absorber is at least as large as the range of dispersion of the torsional natural frequencies of the vehicles which occurs during series production. It is also advantageous in that the weight of the vibration absorber can be reduced to a minimum. The construction of the vibration absorber according to the invention, provides for sufficient stability so that no tilting of the vibration absorber is possible. In addition, it is possible to use a uniform vibration absorber of the same construction in the case of different vehicles.

The weight of the vibration can be further reduced by using a vehicle component as the absorber mass, instead of using a dead mass. The vehicle battery is particularly suitable for this purpose.

In addition to the above-mentioned direct shifting of the absorber mass for changing the distance "b", an additional mass can be shifted with respect to the pivot. It is also advantageous if the adjustment of the natural frequency of the vibration absorber can be adapted continuously to the respective torsional natural frequency of the vehicle. This is significant, because the torsional natural frequency of a vehicle can shift noticeably. Different torsional natural frequencies occur when the vehicle is driven either with an open top or with a closed top or with a hard top. In addition, the loading condition of the vehicle may also have an effect on the torsional natural frequency. The automatic adjustment of the natural frequency of the vibration absorber to the respective torsional natural frequency of the vehicle is achieved by installing the vibration absorber into a control circuit. A variable method of operation of the control circuit, as either a slow or a fast adaptation of the natural frequency of the vibration absorber to the respective torsional natural frequency of the vehicle can take place.

Other objects, advantages and novel features of the present invention will become apparent from the following detailed description of the invention when considered in conjunction with the accompanying drawings.

BRIEF DESCRIPTION OF THE DRAWINGS

FIG. 1 is a top view of a known vibration absorber;
FIG. 2 is a front view of the vibration absorber shown in FIG. 1;

FIG. 3 is a lateral view of a first embodiment of a vibration absorber;

FIG. 4 is a front view of the vibration absorber shown in FIG. 3;

DETAILED DESCRIPTION OF THE DRAWINGS

Figure 5:
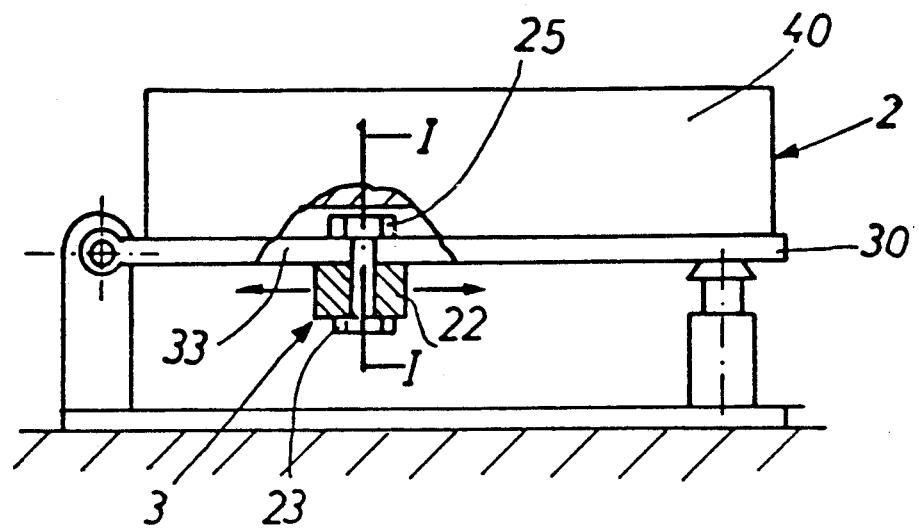
FIG. 5 is a partial sectional view of a second embodiment of a vibration absorber.

FIGS. 1 and 2 show a known vibration absorber which is arranged in a trunk of a convertible below a vehicle battery. A cuboid steel body is used as the absorber mass 2'. The mass 2' is supported by way of four rod-shaped feet 4' underneath bearing arrangements 5', which are each fixedly connected with the vehicle body 1. Each bearing arrangement 5' comprises an absorber spring 10' and a hydraulic absorber damper 20' connected in parallel to the absorber spring 10'. For adapting this vibration absorber to the vibration behavior of the vehicle, it is necessary that the rigidities of the absorber bearing are within a narrow manufacturing tolerance and that the weight of the absorber mass 2' is relatively large. In the present case this amounts to approximately 22 kg. The large weight of the absorber mass 2' leads to problems for the bearing of the vibration absorber due to high moments of tilt that occur.

FIGS. 3 and 4 show a first embodiment of a vibration absorber, the natural frequency of which can be adjusted manually. The absorber mass 2 is a cuboid body 40, which is slideably mounted on guides 31, 41 for movement by a spindle 45 arranged on a bracket plate 30. The bracket plate 30 has one of its ends pivotable around a shaft 7 of a pivot 6. The opposite end of the bracket plate 30 supports itself on two bearing arrangements 5 with two feet 4, each of which comprise an absorber spring 10 and an absorber damper 20 connected in parallel. As shown in FIG. 4, the two bearing arrangements 5 are connected with one another by a web 11. A nut 12 for a spindle 13 is located in the center of the web. The opposite end of the spindle 13 is disposed in the arm 8 of the pivot 6. A guide groove 14 for a guide 15 is located at the side of the web 11 facing the body 1. The guide 15 may either be fastened directly to the body 1 or may be fastened to the body 1 through the intervention of a plate 16. Both ends of the spindle 45 are disposed in two bearing arms 46 and 47 for shifting of the absorber mass 2. A nut 44 is constructed in the body 40 of the absorber mass 2 for transmitting rotational movement of spindle 45. The spindle 45 is turned by adjusting device 48 to thus adjust the position of the body 40. A corresponding adjusting device 17 is provided for spindle 13. The guides 31, 41 and 14, 15 are constructed as dovetail guides.

FIG. 3 shows the variable distance "a" for adjustment of the two bearing arrangements 5 with respect to the pivot 6. The distance "b" shows the variable movement of the center of gravity of the absorber body 40 with respect to the pivot 6.

Figure 6:
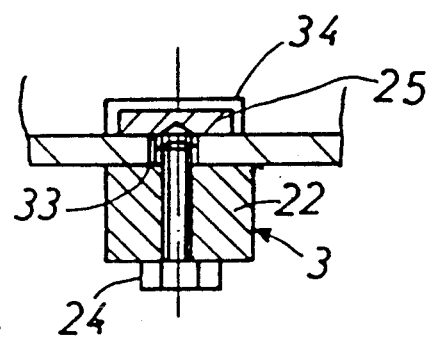
FIG. 6 is a front sectional view of a detail of the vibration absorber along Line I—I in FIG. 5.

FIGS. 5 and 6 show a second embodiment of a vibration absorber in which the change of the natural frequency of the vibration absorber takes place by shifting of an additional mass 3. As a result of shifting the position of the additional mass, the position of the center of gravity of the effective absorber mass distance "b" will change with respect to the pivot 6. As a result, the natural frequency of the vibration absorber will be high when the additional mass 3 is located in immediate proximity of the pivot 6 and correspondingly low when the additional mass 3 is adjusted in proximity of the bearing arrangement 5. A cuboid body 22 is used as the additional mass 3 and is guided in an oblong hole 33 of the bracket plate 30. A screwhead 24 of screw 23 holds the underside of additional body 22 while the other end of the screw 23 is screwed into a nut 25 which supports itself next to the oblong hole 33 on the bracket plate 30. A groove 34 is developed in the absorber body 40 to accommodate the size of the nut 25.

Figure 7:
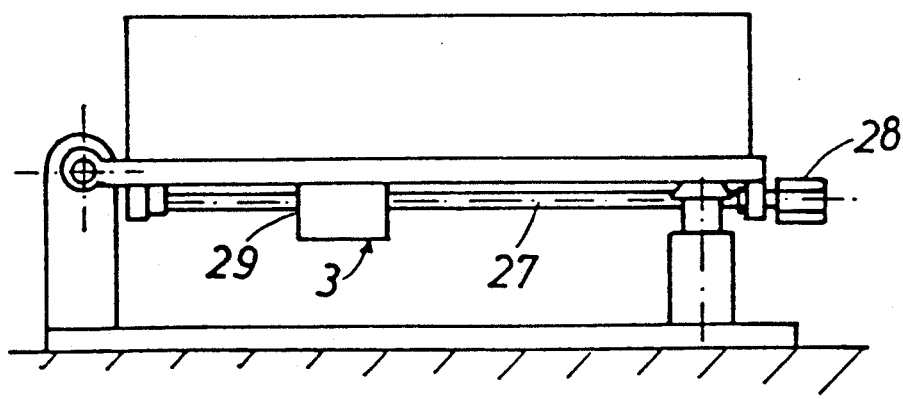
FIG. 7 is a lateral view of a third embodiment of a vibration absorber.

FIG. 7 shows a third embodiment of a vibration absorber, in which the shifting of the additional mass 3 takes place by means of a spindle 27 and an adjusting device 28. Here a nut 29 for the spindle 27 is constructed in the absorber body 22 of the additional mass 3.

Figure 8:
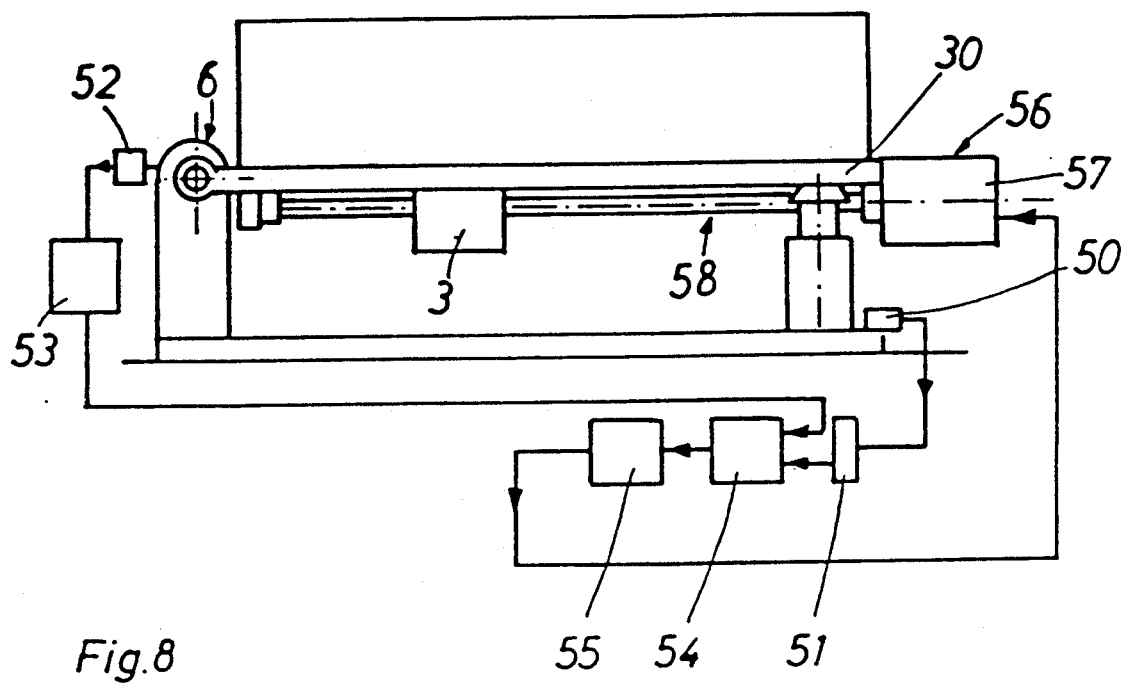
FIG. 8 is a lateral view of a fourth embodiment of a vibration absorber, in which the adaptation of the natural frequency of the vibration absorber to the torsional natural frequency of the vehicle takes place in a control circuit.

FIG. 8 shows a fourth embodiment of a vibration absorber which is installed with a control circuit that is automatically adjusted in response to changes of the torsional natural frequency of the vehicle. The control circuit consists of a sensor 50 which determines values from which the momentary torsional natural frequency of the vehicle (i.e., the desired value of the control variable) is obtained. In the present case, the sensor 50 measures the torsional acceleration of the vehicle. A measured-value transducer 51 converts the torsional acceleration into the torsional natural frequency or into the amplification function thereof. A second sensor 52 is arranged at the pivot 6 and measures the change of the angle of rotation of the bracket plate 30. These values are fed to a second transducer 53 which, from the measured values, determines the momentary natural frequency or the amplification function of the vibration absorber, i.e., the actual value of the control quantity. The transduced values of the vibration absorber and of the vehicle are fed to a desired-value actual-value comparator 54 which forms a desired-value actual-value difference. The determined desired-value actual-value difference is transmitted to a control unit 55 which, at discrete points in time, generates a control quantity. A control element 56 is actuated as a function of the control quantity to adjust the control quantity, i.e., the natural absorber frequency. In FIG. 8, the control element 56 consists of a motor operator 57 and a spindle drive 58 driven by the motor operator 57. This spindle drive 58 changes the position of an additional mass 3 during a rotating movement of the spindle. By means of the embodiment shown in FIG. 8, a quasi-stationary adjustment of the natural frequency of the vibration absorber is possible. In order to achieve this goal, the sensors 50 and 52 measure the momentary values of the torsional natural frequency of the vehicle or the natural frequency of the vibration absorber at defined time intervals. For this purpose, the measured-value transducers 51, 52 each have a scanning element. The additional mass 3 is adjusted corresponding to the time interval. In the described embodiment, the adjustment takes place, for example, at 10-minute time intervals.

Figure 9:
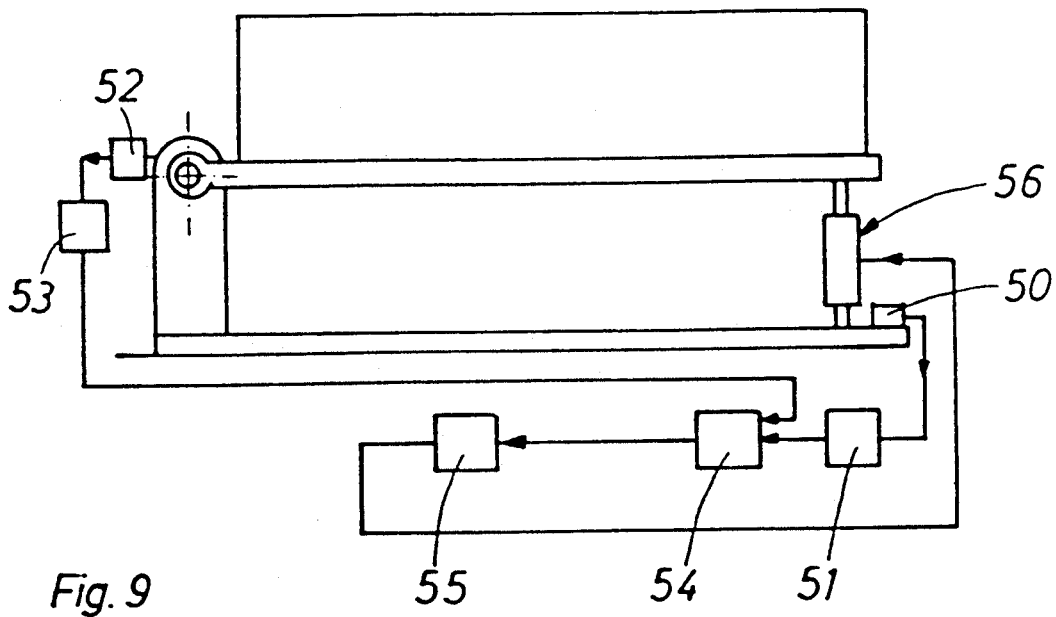
FIG. 9 is a lateral view of a fifth embodiment of a vibration absorber which is also installed in a control circuit.

FIG. 9 shows a fifth embodiment of the vibration absorber in which the natural frequency of the vibration absorber is continuously adapted to the momentary natural frequencies of the vehicle. The control circuit comprises two sensors 50 and 52, two measured-value transducers 51 and 53, one desired-value actual-value comparator 54, one proportional-plus-integral differential control unit 55 and one control element 56. For transmission of the control quantity under circumstances which may change rapidly, the control element 56 must be able to transmit the control quantity correspondingly fast. For this purpose, the control element 56 may, for example, be an electrodynamic exciter or a servohydraulically controlled adjusting cylinder which simulate the desired rigidity and/or damping of the vibration absorber. In addition the control element 56 may be connected in parallel with respect to the bearing arrangement 5.

In addition to a separate adjustment of the absorber mass 2, or of the additional mass 3 or of the bearing arrangement 5, a combined adjustment of the individual parts 2. 3 and 5 may also take place. As a rule, the vibration absorber is arranged in the trunk of a vehicle because at that location the vibration absorber has a high efficiency with respect to the torsional natural vibrations of the vehicle.

Figure 10:
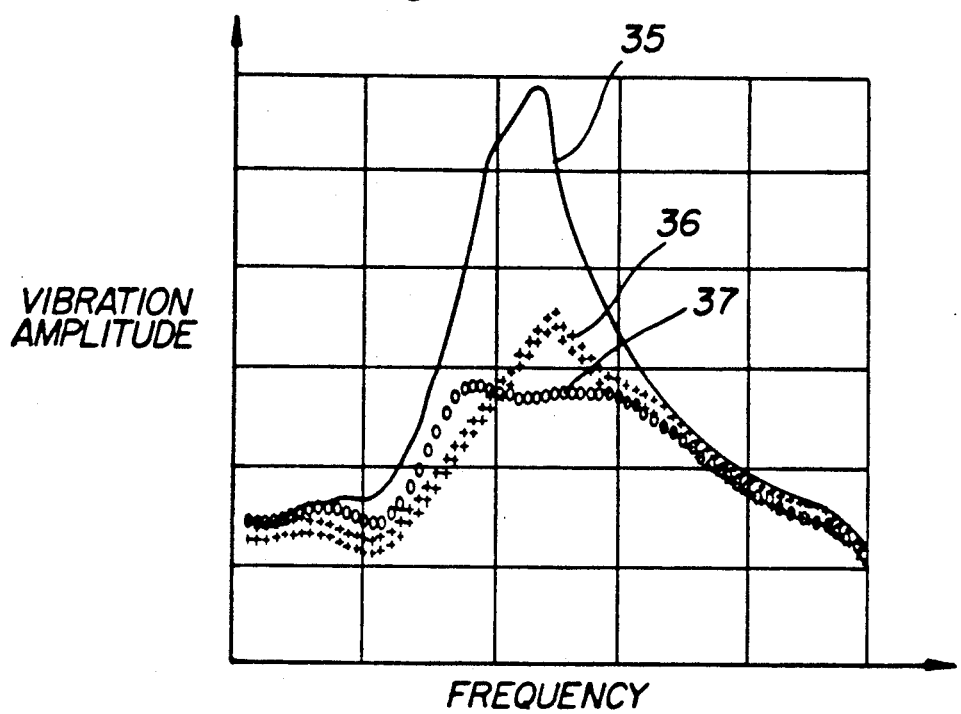
FIG. 10 is a diagram showing the torsional natural frequencies of a vehicle as a function of the installation of a vibration absorber.

FIG. 10 shows a diagram in which the vibration amplitude of a vehicle (the ordinate) is plotted against vibration frequency (the abscissa). Three curves 35, 36, and 37 are shown in the diagram. Curve 35 (formed by dots) shows the vibration behavior of a vehicle which has no vibration absorber. The curve 36 (formed by little stars) shows the vibration behavior of a vehicle which is damped by means of a known vibration absorber. The curve 37 (formed by small circles) represents the vibration behavior of a vehicle which is equipped with a vibration absorber according to FIG. 3 to 8.

Figure 11:
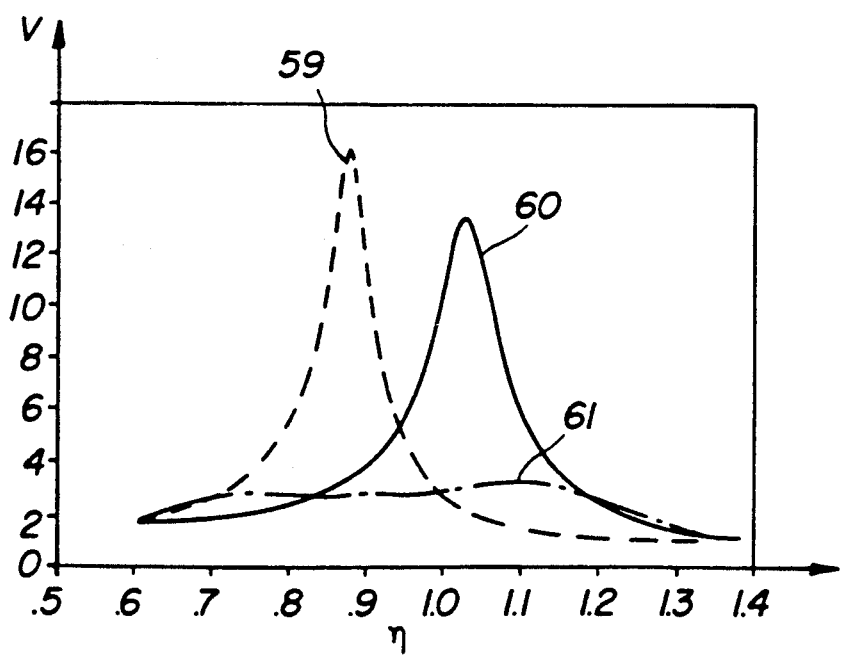
FIG. 11 is a diagram showing the effects of an optimal and not optimal adaptation of the natural frequency of the vibration absorber to the vibration behavior of the vehicle.

FIG. 11 shows a diagram in which the amplifying function V of the vehicle motion in the torsional degree of freedom is the ordinate and the frequency ratio $\eta$ is the abscissa. FIG. 11 shows three curves 59, 60 and 61. The interrupted curve 59 corresponds to an amplifying function V, if the natural absorber frequency is too high. The solidly drawn curve 60 corresponds to an amplifying function when the natural absorber frequency is too low. The dash-dotted curve 61 shows an amplifying function of an optimally adapted vibration absorber. By means of the control circuits shown in FIGS. 8 and 9, natural absorber frequencies which are too high or too low are avoided and a natural frequency of the vibration absorber that is corresponding adapted to curve 61 is achieved.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A damping arrangement having an adjustable natural frequency, for absorbing vibrations in a vehicle having a vehicle body and a vehicle battery, comprising:

an absorber mass comprising at least said vehicle battery, and having a center of mass;

support means for supporting said absorber mass on the vehicle body, said support means being pivotably coupled to said vehicle body by a pivotable coupling at a first end thereof, and being supported on said vehicle body at a second end opposite said first end by at least one bearing comprising an absorber spring and an absorber damper, said absorber spring and absorber damper being connected in parallel;

means for modifying the natural frequency of said damping arrangement by varying at least a distance between said pivotable coupling and the center of mass of said absorber mass; and a control circuit for automatically controlling said means for modifying the natural frequency of the damping arrangement, in response to vibrations of the vehicle body.

2. A vibration absorber according to claim 1, wherein the absorber mass is slideably connected with a bracket plate by way of guides, and wherein the bracket plate is attached, at a first end, to the pivot and rests on the bearing at its other end.

3. A vibration absorber according to claim 2, wherein the natural frequency of the vibration absorber can be adjusted by changing a distance between the bearing and the pivot.

4. A vibration absorber according to claim 2, wherein the absorber mass comprises a main mass and an additional mass.

5. A vibration absorber according to claim 1, wherein the natural frequency of the vibration absorber can be adjusted by changing a distance between the bearing and the pivot.

6. A vibration absorber according to claim 5, wherein the adjustment of the natural frequency of the vibration absorber can be performed manually.

7. A vibration absorber according to claim 1, wherein the absorber mass comprises a main mass and an addition mass which is movable separately relative to said main mass.

8. A vibration absorber according to claim 1, wherein the control circuit comprises:

a first sensor means for measuring a momentary torsional natural frequency of the vehicle;

a second sensor means for measuring values of a momentary natural frequency of the vibration absorber;

a desired-value actual-value comparator to which the two sensors are connected and which forms a desired-value actual-value difference;

a control unit which generates a control variable as a function of the desired-value difference; and a control element which adjusts the natural frequency of the vibration absorber as a function of the control variable.

9. A vibration absorber according to claim 8, wherein the control unit is a proportional-plus-integral differential control unit.

10. A vibration absorber according to claim 8, wherein the sensors respond to measured-value transducers, each being provided with a scanning element which, at defined time intervals, transmit the desired value and the actual value to the desired-value actual-value comparator.

11. A vibration absorber according to claim 8, wherein the control element is the bearing, and wherein the control unit generates a control signal to adjust at least one of spring rigidity and damping.

12. A vibration absorber according to claim 11, wherein the control element is the bearing which has two parallel connected elements, and wherein the control elements adjusts at least one of spring rigidity and damping.

13. A vibration absorber according to claim 11, wherein the control element is at least one of: an electrodynamic exciter and a servo hydraulically controlled adjusting cylinder.

14. A vibration absorber according to claim 8, wherein the control element is the bearing which has two parallel connected elements, and wherein the control element adjusts at least one of spring rigidity and damping.

15. A vibration absorber according to claim 8, wherein the control element is at least one of: an electrodynamic exciter and a servohydraulically controlled adjusting cylinder.

* * * * *